(12) United States Patent
Bhat et al.

(10) Patent No.: US 11,093,781 B2
(45) Date of Patent: Aug. 17, 2021

(54) CUSTOMIZED ACTION BASED ON VIDEO ITEM EVENTS

(71) Applicant: Amazon Technologies, Inc., Seattle, WA (US)

(72) Inventors: Vimal Bhat, Redmond, WA (US); Shai Ben Nun, Marina Del Rey, CA (US); Hooman Mahyar, Los Angeles, CA (US); Harshal Wanjari, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 120 days.

(21) Appl. No.: 16/208,074

(22) Filed: Dec. 3, 2018

(65) Prior Publication Data
US 2020/0175303 A1 Jun. 4, 2020

(51) Int. Cl.
| | |
|---|---|
| *G06K 9/32* | (2006.01) |
| *G06N 20/00* | (2019.01) |
| *G06K 9/00* | (2006.01) |
| *H04L 12/58* | (2006.01) |
| *H04N 21/8549* | (2011.01) |
| *H04W 4/14* | (2009.01) |

(52) U.S. Cl.
CPC ....... *G06K 9/3241* (2013.01); *G06K 9/00228* (2013.01); *G06N 20/00* (2019.01); *H04L 51/10* (2013.01); *H04L 51/24* (2013.01); *H04N 21/8549* (2013.01); *H04W 4/14* (2013.01)

(58) Field of Classification Search
CPC .. G06K 9/3241; G06K 9/00228; G06N 20/00; H04N 21/8549; H04L 51/24; H04L 51/10; H04W 4/14
See application file for complete search history.

(56) References Cited

U.S. PATENT DOCUMENTS

| | | | |
|---|---|---|---|
| 9,953,242 B1 | 4/2018 | Tyagi et al. | |
| 10,008,099 B2 * | 6/2018 | Drolshagen | ........ G06K 9/00912 |
| 2006/0227997 A1 * | 10/2006 | Au | ................... G08B 13/19682 |
| | | | 382/103 |

(Continued)

FOREIGN PATENT DOCUMENTS

| | | |
|---|---|---|
| EP | 3009959 A2 | 4/2016 |
| WO | WO2006104903 A1 | 10/2006 |

OTHER PUBLICATIONS

The PCT Search Report and Written Opinion dated Mar. 3, 2020 for PCT Application No. PCT/US19/62855, 12 pages.

*Primary Examiner* — Nizar N Sivji

(74) *Attorney, Agent, or Firm* — Lee & Hayes, P.C.

(57) ABSTRACT

A user may indicate an interest relating to events such as objects, persons, or activities, where the events included in content depicted in a video. The user may also indicate a configurable action associated with the user interest, including receiving a notification via an electronic device. A video item, for example a live-streaming sporting event, may be broken into frames and analyzed frame-by-frame to determine a region of interest. The region of interest is then analyzed to identify objects, persons, or activities depicted in the frame. In particular, the region of interest is compared to stored images that are known to depict different objects, persons, or activities. When a region of interest is determined to be associated with the user interest, the configurable action is triggered.

20 Claims, 8 Drawing Sheets

(56) References Cited

U.S. PATENT DOCUMENTS

| | | | | |
|---|---|---|---|---|
| 2009/0324010 A1* | 12/2009 | Hou | ................... | G06K 9/00771 |
| | | | | 382/103 |
| 2012/0219271 A1* | 8/2012 | Vunic | ................ | G06K 9/00711 |
| | | | | 386/278 |
| 2013/0128034 A1* | 5/2013 | Carr | ........................ | G06T 7/254 |
| | | | | 348/135 |

* cited by examiner

CUSTOMIZED ACTION BASED ON VIDEO ITEM EVENTS

BACKGROUND

A large and growing population of users enjoy entertainment through consumption of video items. "Video items" and "video content," as used herein, include television shows, sporting events, concerts, movies, documentaries, and the like. Video content available to users includes previously-recorded video content and live, or near-live (also referred to herein as real-time or near real-time), video content. Traditionally, video content was accessible through a limited number of telecommunication mediums (e.g., television sets). Many people today consume video content through a wide variety of electronic devices. Among these electronic devices include cellular telephones, tablet computing devices, digital media players, laptop computers, desktop computers, television, virtual reality devices, and the like. Video content is available through a variety of services including broadcast channels via antenna and/or satellite, cable channels, cable and satellite replacement services, subscription and non-subscription streaming services, websites, mobile applications, pay-per-view services, and the like.

As more video content is made available to users through a growing number of electronic devices and services, there is a need for advancement with respect to user experience when consuming video content, including live video content. There is also a need to provide users with systems and processes to facilitate configurable consumption of video content.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
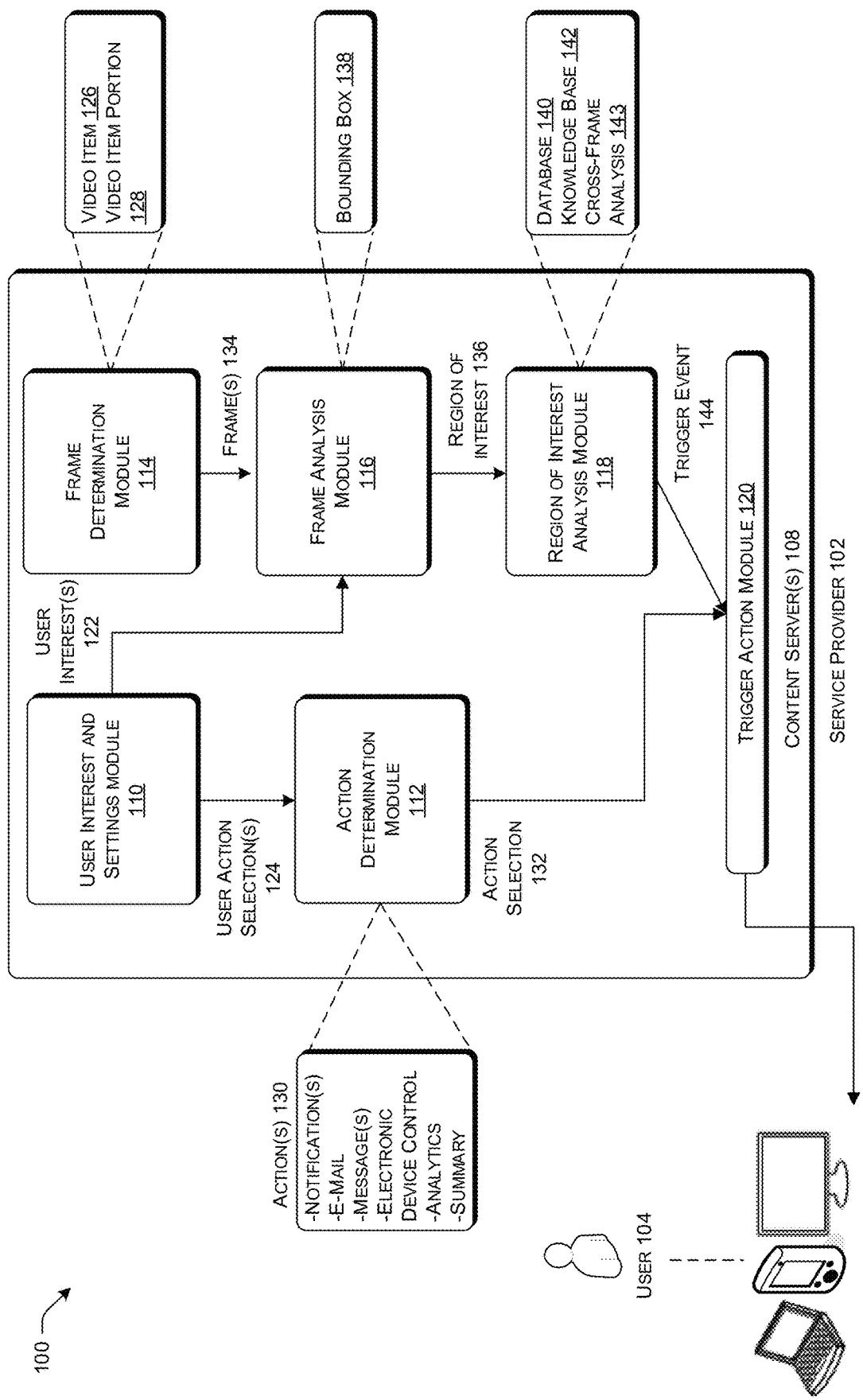
FIG. 1 illustrates an example system for triggering an action based on identifying an event in a video item.

In the context of video items, including video content, accessible to users via electronic devices, there are challenges providing customizable consumption options for individual users. For instance, users often spend large amounts of time sifting through available video content offered via an increasing number of services. With respect to consuming video items, users may seek to improve their user experience. Users may wish to select, or be recommended, configurable actions to both supplement their ability to find suitable programming and to supplement a viewing experience. In addition, users may wish to stay up-to-date on objects, persons, and activities included in video content when they are away from their electronic devices (e.g., receive updates on particular actresses or particular athletes).

For instance, a user may indicate in their user settings their love of the show "Jeopardy." The user, interested in playing along with the contestants in the show, may desire a configurable action to be triggered in the event the host of show, Alex Trebek, appears on screen. The configurable action may be to increase the audio-volume by a predetermined amount of their television set when Alex Trebek appears on screen to read questions and to return the audio-volume to the pre-increased level when Alex Trebek is off-screen. In this way, the user may be able to better hear the questions from the host. In addition, the user may better attempt to answer the question when the host is off-screen because the contestants' answers are presented with a relatively lower audio-volume and therefore may not be influenced by the contestants' answers. By being able to parse the meaning of video content, there are numerous opportunities to leverage this meaning to trigger configurable actions to improve a user's experience when consuming a video item (e.g., increasing and decreasing audio volume of a television show). Based on the quantity and variety of video content available for consumption by users, the ability to provide customizable solutions for a user allows users to become a more active participant during their video item consumption.

Specifically, in the context of live-video content, there are additional challenges to determining the events included in the video content in real-time such that the determined events may be leveraged to trigger configurable actions. For instance, during a live presentation of a baseball game there are events with respect to the various objects, players, and activities that occur during the course of the game. With respect to objects: uniforms, baseballs, bats, helmets, cleats, bases, base paths, foul poles, wind-direction flags, and in-game video monitors are presented during the course of the game. With respect to players: particular players, coaches, and/or umpires participate in the game. With respect to actions: hits (e.g., singles, doubles, triples, and home-runs), pitches (e.g., strikes, balls, strikeouts, walks, fastballs, curveballs, sliders, cutters, and knuckleballs), and other miscellaneous actions (e.g., stolen bases, runners caught stealing bases, pinch or replacement hitters and pitchers), occur during presentation of the video content.

Further, in the context of professional baseball, these various objects, players, and activities occur during each game for every team. Baseball fans, even the most enthusiastic supporters, are tasked with keeping tabs on the hundreds of players and the thousands of professional baseball games that are played each year. For instance, a person may be unable to keep track of their favorite players and teams. In some instances, manual extracting may be performed to provide users with alerts to tune-into a specific game. However, these alerts are often generalized to users (e.g., scoring play alerts, game start times) and require human intervention, at least partially, to be performed.

This problem is exacerbated if a user is also interested in keeping up with multiple types of live video content (e.g., sports, current events, politics, or concerts) and/or prerecorded video content (e.g., television shows, movies, or documentaries). The user, wishing to keep track of particular events included in video content, are faced with an overwhelming quantity and variety of video content to sift through. Further, the user may also wish to have customized actions (e.g., notifications via an e-mail message, short message service (SMS) message, and/or multimedia messaging service (MMS) message) occur when a particular event occurs. For instance, when a particular baseball player enters the game (or is up to bat), the user may wish to receive a text message notification alerting them of the event. A user may also desire to customize what events trigger the actions (e.g., notifications) as their interests shift.

These challenges represent a technological problem because they are based on an inability to analyze, extract, and determine events in video content. The inability to capture events included in video content, including in live or near-live video content, is a result of an inability to mimic human semantic understanding by a machine. Accordingly, there is currently a missed opportunity to associate semantic understanding of video content, events, to trigger actions (e.g., notifications) that could improve user experience.

Traditionally, as video content is presented and/or ran, events included in the video content were extracted manually. For instance, in the context of a baseball game, as the events of the game are occurring live, a human would watch the game and manually extract and/or record the events of the game (e.g., runs scored, player changes). The manual extraction occurred because of an inability for a computer to understand the content of the video data. Manual extraction was needed for semantic understanding of nuanced situations included in video content (e.g., a sequence of actions during baseball game). Computers lacked the ability to understand when events were occurring in video content, especially in real-time. Further, this extraction occurred at a generalized level as opposed to at an individual user level. In addition, after manually extracting events from video data, there were challenges associating events with triggers to complete user facing actions. These shortcomings are at least a result of insufficient systems and processes to determine events in video content and to trigger actions accordingly.

The systems and processes described herein provide techniques for determining events (e.g., objects, persons/faces, and activities) included in video content. In addition, techniques for associating and triggering user-facing actions based on determining the events are described herein. The techniques are directed to solving the problem of an inability for a computer to understand events included in video items, and specifically, in video content. These techniques can be performed in real-time. For instance, these techniques can be applied to live or near-live video items.

The techniques herein are also directed to solving the problem of associating events included within video content to customizable, user-facing actions. In various embodiments, these techniques improve the functionality of electronic devices. User-facing electronic device functionality may be modified as a result of determining an event included in the video content. For instance, in response to determining a particular player has entered a baseball game (i.e., an event), a television set may increase the audio volume by a configurable level (i.e., an action).

Additionally, the techniques herein enable a computer to perform functions that the computer could previously not perform. Traditional methods to solve challenges with extracting events included in a video related to manual extraction. Further, manual extraction was traditionally generalized event detection rather than tailored to individual user interests. In addition, generalized event detection was used in conjunction with generalized user-facing actions. In addition, these traditional methods represented a considerable burden on a computer network. Manual extraction requires considerable electronic and human resources to present and consume video content for extracting semantic understanding. In addition, this labor intensive process was often completed using associated networks.

In various embodiments, users may view and interact with content via an electronic device. These electronic devices include cellular telephones, tablet computing devices, digital media players, laptop computers, desktop computers, television, virtual reality devices, and the like. In various embodiments, a user may access a site that displays or presents a plurality of video items. A user may also consume video items through broadcast channels via antenna and/or satellite, cable channels, cable and satellite replacement services, subscription and non-subscription streaming services, websites, mobile applications, pay-per-view services, and the like. A video item may be created by a service provider or may be received from individuals or entities that author, create, broadcast, or facilitate presentation of the video item. The user may consume the video item via the electronic device.

Techniques are disclosed herein to determine an event included in a video item and to associate the event with a user-facing action. A frame can be determined from a video item and/or video item portion. A video item can be broken up into individual frames. A frame may include an image representing a time period, interval, and or/instance of the video item. A video item can be divided into a predetermined number of frames. In various embodiments, the number of frames can be based on predetermined time periods. For instance, one frame may be an image representing one second of a video. The number of frames representing the video item may be a single frame. In various embodiments, the number of frames may be based on the frame rate of the video item and/or the number of frames may be based on varying time periods in the video item. For instance, a first video item portion may represent one frame per one second of the video. A second video item portion may represent one frame per three seconds of the video item. A third video item portion may be represented by a single frame. Therefore, the video item may be broken up according to a fixed time interval or a variable time interval. For instance, a 60 second, live-video may be broken into frames. Each frame may be an image representing one second of the live-video. Therefore, the live-video would be broken into 60 frames. In various embodiments, a video item may be previously broken into frames and received by the content servers. In some instances, timestamp data may be extracted, determined, and/or associated with different video item portions and/or frames.

In various embodiments, a user interest associated with an event (e.g., an object, a person, and/or an activity) they are interested in following may be received and/or determined. In various embodiments, the service provider and/or content servers may receive or determine a user interest. In some instances, a user may indicate they are interested in following a particular person. For example, the user may indicate they are interested in the following: her favorite baseball players (persons); any player in that is playing wearing a particular type of shoe (objects); and any Major League Baseball player that hits a home run (activities). In various embodiments, user interests may be associated with user settings and/or user preferences. In various embodiments, a user may indicate a user interest via an electronic device. In some instances, a user may select options from predefined fields or provide comments. In any event, user interests of a user may be stored in association with a user profile or user account that is associated with the user and that is possibly maintained by a service provider that offers video items for consumption.

In various embodiments, a user interest may be system generated, determined, and/or received by the content servers and/or service provider. In some instances, a user interest may be recommended to the user via the service provider. For instance, based on user settings, user preferences, previous purchases, previously consumed video items, and/or user information, and user interests can be recommended to the user. In some instances, a user may be included in a user group with additional users with similar interests. The user group may receive recommendations recommending a potential interest to the group. For instance, a user may be included in a "Seattle Sports" user group based on their user settings. The "Seattle Sports" user group may be automatically provided with a recommendation to follow particular players on sports teams located in or around Seattle, Wash.

In various embodiments, a user interest associated with an event may indicate an action to associate with the events (e.g., objects, person, and/or events) they are interested in following. In some instances, the action selection may include receiving a notification, receiving an short message service (SMS) message, receiving a multimedia messaging service (MMS) message, receiving an e-mail message, causing the video item to be presented via an electronic device, causing an electronic device to be powered on and/or off, causing an electronic device to increase and/or decrease in audio volume, recording a video item or video item portion, causing an electronic device to identify a second electronic device, causing an electronic device to be communicatively coupled to a second electronic device, causing a summary of the event to be sent to the user, and/or causing analytics associated with the event to be sent to the user. In various embodiments, analytics may include web analytics, predictive analytics, retail analytics, marketing analytics, customer analytics, business analytics, real-time analytics, digital analytics, and/or other similar statistical tools. For instance, a user may have indicated a user interest associated with the event of a particular baseball player entering a game. The user may indicate that when the particular player enters the game, they would like to receive an SMS message to be sent to their mobile device notifying them that the particular player has entered the game. In various embodiments, the user may opt-in or opt-out of action selection.

In various embodiments, and upon receiving, determining, generating, and/or extracting the frame, the frame may be analyzed to determine a region of interest. In various embodiments, the frame is analyzed based on the user interest. In various embodiments, the frame is analyzed based on a system-generated user interest. In various embodiments, a bounding box is determined and/or generated. A bounding box may also be referred to as a "minimum bounding box" or a "minimum-perimeter bounding box." In some instances, the bounding box includes a rectangular area configured to enclose a pixel and/or a plurality of pixels included in the frame. In some instances, the bounding box may be configured to enclose an area that includes a pixel and/or plurality of pixels. In some instances, the dimensions, length and width, may be predefined. In various embodiments, the bounding box may be defined by a polygon with n-sides where "n" represents a number of sides configured to enclose a pixel and/or plurality of pixels. In various embodiments, the bounding box may be defined by a three-dimensional shape. In some instances, the bounding box may be defined by a polyhedron and configured to enclose a volume. The bounding box may be used to detect regions of interest in the frame. In some instances, image embedding, object detection, computer vision learning algorithms, object localization, and/or the like are used to detect the regions of interest in the frame. For instance, a bounding box may be moved across the frame representing an image from a baseball game. The bounding box can determine regions of interest relating to objects in the frame (e.g., a bat, a glove, a hat, a shoe) and/or relating to persons in the frame (e.g., a human face). In some instances, a plurality of frames can be individually analyzed to determine a region of interest in each frame of the plurality of frames.

In various embodiments, the bounding box is moved across a frame to determine if a region of interest is included in the frame. The bounding box can be used to scan, analyze, determine, and/or detect the entire frame and/or a portion of the frame. In some instances, multiple regions of interest can be detected in the frame. In some instances, the region of interest may be associated with facial detection, object detection, emotion detection, and activity detection.

In various embodiments, the region of interest is compared to an identified image and/or identified images representing various events in a database. In some instances, a similarity between the region of interest and a previously identified event may be determined. For instance, a similarity may be based on a cosine distance, a vector comparison, or a Euclidean distance between the region of interest and the identified image. In some instances, a similarity between the region of interest and the identified image may include comparing a similarity value with a predetermined similarity threshold. In some instances, the identified images stored in the database may include identified objects, persons, faces, emotions, and/or activities.

In various embodiments, the database may include a knowledge base. The knowledge base may include an ontology representing a plurality of identified images and relationships between identified images. For instance, the ontology may include a semantic graph that receives an input value and outputs a node of the graph associated with the input value. For instance, the ontology may include a hierarchy of Major League Baseball including a graph with teams, games, and players. In various embodiments, the knowledge base may include embedded outputs from various neural network models. In some instances, the embedded outputs may be manually or automatically scraped from websites. For instance, the knowledge base may include machine representations of a face of a particular actress that is automatically scraped from a website and stored in the database. In various embodiments, multiple regions of interest may be aggregated into a single value and compared to an identified image value. In some instances, a region of interest may include a particular object and a particular face. A master value can be determined representing the particular object and the particular face and compared to an identified image and associated value. In some instances, the master value can be compared to an identified image value with respect to a predetermined similarity threshold.

In various embodiments, a first region of interest from a first frame can be compared to a second region of interest in a second frame. In some instances, the first region of interest and the second region of interest may be substantially located in a similar portion of the frame.

In various embodiments, human activity detection in multiple frames of a video item may be performed. In various embodiments, human activity detection may also be referred to as prose detection. In some instances, markers (e.g., points) may be placed on a human body within a frame of a video item. For instance, points may be placed on the joints of a human body. In some instances, lines connecting the markers may be used to generate a skeletal representation of a human body. In some instances, cross-frame analysis may be used to determine changes in the lines connecting the markers in multiple frames. For instance, a marker on a hip joint, a knee joint, and an ankle joint on a human body may be connected by lines to generate a representation of a human leg in a first frame. The skeletal representation of the human leg may be analyzed in subsequent frames to determine changes in leg position over time. For instance, a frame may represent one second of a video. The representation of the human leg may be analyzed in 20 sequential frames representing 20 seconds of the video to determine changes in leg position. For instance, based on analyzing the 20 sequential frames it may be determined that the leg is being used to walk, jog, or run. In various embodiments, human activity detection in multiple frames may be compared to identified human activities stored in the knowledge base. In various embodiments, human activities may be predicted based on cross-frame analysis over a period of time. In various embodiments, a machine learning model and/or neural network may be used to identify the regions of interest in a frame.

In various embodiments, the region of interest may be identified as being associated with user selection, a user interest, and/or an event. In some instances, the region of interest may be identified using a machine learning model and/or a neural network. For instance, a region of interest in a frame may be determined to be a particular object or a particular face using a machine learning model and/or neural network. In various embodiments, the identified region of interest is compared to the user interest associated with an event (e.g., an object, a person, and/or an activity). In response to determining the region of interest is associated with the user interest, an action may be triggered.

The user may also indicate an action selection that is associated with the event. For instance, the identified region of interest may indicate that a particular baseball player has entered the game. The user may have previously indicated that she was interested in knowing when the particular baseball player enters a game. Therefore, after the identified region of interest may be determined to be associated with the user interest an action is triggered. In some instances, the identified region of interest may be determined to be different than the user interests. For instance, if the identified region of interest and the user interest are different, then the triggered action may be discontinued, paused, stopped, and/or prevented from occurring.

In various embodiments, after triggering the action, the user may provide feedback data associated with the identified region of interest and/or the triggered action. The user may provide comments, corrections, or feedback indicating an accuracy and/or helpfulness of the identified region and/or the triggered action.

For the purposes of this discussion, a video item, also referred herein as video content, may be manifested in many different ways including, for example, as text-based items, audio items, video items, multimedia items, graphical items, and so forth. Examples of the video item include television shows, sporting events, concerts, movies, limited-series, documentaries, slide shows, graphical presentations, and graphic interchange formats (GIFs). The video item may also be configured for use in a virtual reality or augmented reality environment.

FIG. 1 illustrates an example system 100 for triggering an action based on identifying an event in a video item. The system 100, may include a service provider 102, a user 104, and an electronic device 106 associated with the user 104. In various embodiments, the service provider 102 may be any entity, server(s), platform, etc. that offers items (e.g., products, services, etc.) to a user 104 via an electronic marketplace (e.g., a website, a mobile application, etc.) associated with the service provider 102. That is, a user 104 may access the electronic marketplace via a corresponding electronic device 106 for the purpose of searching for, viewing, selecting, acquiring (e.g., purchasing, leasing, renting, borrowing, lending, etc.) items, etc. The items may be provided directly by the service provider 102 or may be provided by the service provider 102 on behalf of a different entity. Provided that the items are video items, the video items may be available through a variety of services including broadcast channels via antenna and/or satellite, cable channels, cable and satellite replacement services, subscription and non-subscription streaming services, websites, mobile applications, pay-per-view services, and the like. That is, via a website, an electronic marketplace, and/or a mobile application associated with the service provider 102, the users 104 may place orders for items. The electronic device 106 may be a mobile phone, a smart phone, a personal digital assistant, a portable media player, a tablet computing device, a laptop computer, a desktop computer, a digital media player, a television, virtual and/or augmented reality devices, gaming consoles, electronic book (eBook) reader devices, or the like.

User data associated with the user 104 may be determined from the user profile of a user 104. For instance, personal information (e.g., address, telephone number, etc.), demographic information (e.g., age, gender, ethnicity, etc.), interests of the user 104 (e.g., sports, movies, hobbies, etc.), may be collected. Other user data may be stored on content server(s) 108 in association with the user profile of the user 104. Such data may include the user's 104 activity with respect to a retail site associated with the service provider 102, such as search history, purchase history, viewing history, a saved-items list (i.e., a "wish" list), reviews submitted by the user 104, and so on.

The service provider 102, may include, or be associated with, one or more devices (e.g., content server(s) 108). Moreover, the content servers 108 may contain any number of servers that are possibly arranged as a server farm. Other server architectures may also be used to implement the content server(s) 108. In various embodiments, the content server(s) may maintain one or more modules, such a user interest and settings module 110, an action determination module 112, a frame determination module 114, a frame analysis module 116, a region of interest analysis module 118, and/or a trigger action module 120.

In various embodiments, the user interest and settings module 110 of content servers 108 may collect or determine user interest(s) 122 and user action selection(s) 124. The user interest 122 is associated with an event (e.g., an object, person, and/or activity) that a user 104 is interested in following. In some instances, the user 104 may indicate they are interested in following whenever particular actress appears in a video item 126 and/or video item portion 128. The user interest may be collected by the user interest and settings module 110.

In some instances, the user 104 may indicate they are interested in following when their favorite baseball player comes up to bat. The user 104 may indicate a plurality of events (e.g., objects, persons, and activities) that they are interested in following. For example, the user 104 may indicate that she is interested in the following: the user's 104 two favorite baseball players, Robinson Cano and Nelson Cruz of the Seattle Mariners (persons); any player in Major League Baseball that is wearing a particular type of shoe (objects); and any Major League Baseball player that hits a home run (activities). In various embodiments, user interests 122 may be associated with user action selections 124 and/or user preferences. In various embodiments, a user 104 may indicate a user interest 122 via a website, mobile application, etc., that is accessible via an electronic device 106. In some instances, the user 104 may access a mobile application associated with an internet video and/or audio on demand service and select and/or input settings related to a user interest 122 (e.g., preferences, alerts, notifications, and/or alarms). In various embodiments the user 104 may send a short message service message (SMS) and/or multimedia messaging service (MMS) message indicating a user interest 122 to the user interest and settings module 110. In various embodiments, the user 104 may indicate audibly a user interest 122 to a voice-controlled device, a smart speaker, and/or similar technology. In particular, the user 104 may audibly utter a voice command that is captured by one or more microphones of a device. The device and/or a cloud-based service associated therewith may process the voice command (e.g., an audio signal representative of the voice command) using automated speech recognition (ASR) techniques, natural language understanding (NLU) techniques, and so on. In some embodiments, the device may output (e.g., audibly via one or more speakers, visually via a display, etc.) a notification to the user that is responsive to the voice command and that is related to an event. In some instances, a user 104 may select options from predefined fields or provide comments. For instance, a user 104 may select, "Robinson Cano" from a predefined field containing players that may be followed. A user 104 may also provide in plain-text in a text entry field, "I would like to follow Robinson Cano."

In various embodiments, the user interest 122 may be system generated and collected by the user interest and settings module 110. In some instances, the user interest 122 may be based on historical information associated the user including previous purchases or previously consumed video items. In some instances, the user interest 122 may be based on user settings and or user preferences. For example, a user interest 122 may be based on a user's 104 age, location, type of employment, and/or gender. In addition, a user interest 122 may be based on a user's 104 social media activity. In some instances, a user interest 122 may be associated with a user 104 providing inputs to a selectable field, predefined, or comment field indicating an event (e.g., object, person, or activity) that they are interested in. In various embodiments, a user 104 may be included in a user group by the service provider 102. The user 104 may be grouped with other users with similar interests based on collected and determined user interests. The user group may receive recommendations indicating a potential user interest. For instance, a user 104 may be included in a "Seattle Sports" user group based on their user settings. The "Seattle Sports" user group may be automatically provided with a recommendation to follow particular players on sports teams located in and around Seattle, Wash. In various embodiments, the user interest 122 identifies events (e.g., objects, persons, or activities) that a user 104 is interested in.

In various embodiments, the user interest and settings module 110, collects user action selections 124. The user action selection 124 may be associated with an opt-in to connect a user interest 122 to a triggerable action. A user 104 may also opt-out of a triggerable action. In addition, a user action selection 124 may be associated with selecting a type of action that the user 104 would like to connect to a user interest 122. In some instances, a default action may be associated with a user interest 122. For instance, a user 104 on their tablet computing device may select actions from a drop-down list in a user settings and/or preferences portion of their account settings via a website. In various embodiments, the user 104 may be presented with potential user selections based on a user interest 122. For example, a user 104 may be interested in following a musician performing live in-concert. The user 104 indicates that the musician is a user interest 122. The user 104 may then be presented with potential user selections that are available to connect with the musician performing live. For instance, only a subset of actions 130 may be available for selection.

In various embodiments, the action determination module 112 of the content servers 108 may receive user action selections 124 from the user interest and settings module. Based on the user action selection 124, an action 130 may be determined. For instance, the user action selection 124 may indicate the user 104 has opted-in to actions based on a user interest 122. In addition, the user action selection 124 may indicate actions the user 104 would prefer based on a user interest 122. For instance, user action selections 124 may indicate a user would like to receive SMS and MMS updates, but not e-mail messages, based on a user interest 122. The actions 130 may include receiving a notification, receiving an SMS, receiving an MMS, receiving an e-mail message, causing the video item to be presented via an electronic device, causing an electronic device to be powered on and/or off, causing an electronic device to increase and/or decrease in audio volume, recording a video item or video item portion of a video item (e.g., record some, but not all, of the video item), causing an electronic device to identify a second electronic device, causing an electronic device to be communicatively coupled to a second electronic device, causing a summary of the event to be sent to the user 104, and/or causing analytics associated with the event to be sent to the user 104. For instance, a user 104 may have indicated a user interest 122 associated with the event of a particular baseball player entering a game. The user 104 may indicate that when the particular player enters the game, they would like to receive an SMS message to be sent to their mobile device notifying them that the particular player has entered the game. That way, the user 104 may begin watching the game while that particular player is on the field, is batting, etc. In various embodiments, the action determination module 112 determines an action selection 132 based on the user action selection 124 and the action(s) 130.

In various embodiments, the frame determination module 114 may receive a video item 126 or a video item portion 128. The frame determination module 114 then determines a frame or a plurality of frames associated with the video item 126. A video item 126 may be broken into individual frames 134. A frame 134 may include an image, or a still image, representing a time period, interval, and/or instance of the video item 126. For instance, a frame 134 may be a still image representing $\frac{1}{100}^{th}$ of the video. In some instances, the video item 126 can be divided into a predetermined number of frames 134. For instance, the video item 126 may be divided based on a predetermined ratio (e.g., one frame per $\frac{1}{100}^{th}$ of a video) and/or based on a predetermined time period. For instance, a frame 134 may represent one second of a video item 126. In some instances, the number of frames 134 may be a single frame representation of the video 126. In some instances, a maximum number of frames 134 may be based on the frame rate of the video item 126. For instance, a 60-second video item 126 with a frame rate of 60-frames-per-second may be broken into 60 frames 134.

In some instances, a video item 126 may be divided into frames 134 that each represent a fixed interval. For example, a 60-second video item 126 may be broken into 15 frames 134. Each frame represents four seconds of the video item 126. In some instances, a video item 126 may be divided into frames 134 that each represent a varying interval. For example, a 60-second video item 126 may be broken into 15 frames 134, wherein ten of the 15 frames 134 each represent five seconds of the video item (50 seconds) and the remaining five of the 15 frames 134 each represent two seconds of the video item (10 seconds). In other words, a first portion of the video item 126 may be broken up into frames 134 based on a first time interval per frame 134 and a second portion of the video item 126 may be broken up into frames 134 based on a second time interval per frame 134. In various embodiments, the frame determination module 114 may also receive a frame 134 via the service provider 102 or a different third party resource.

In various embodiments, the frame analysis module 116 receives the user interest 122 and the frame 134 and analyzes the frame to determine a region of interest 136. In various embodiments, the frame 134 is analyzed based on the user interest 122. For instance, the user interest 122 may indicate a user 104 is interested in an object (e.g., a baseball). The frame 134 is then analyzed to identify a region of interest 136 that contains a baseball. The frame 134 can also be analyzed based on a system-generated user interest 122.

In various embodiments, a bounding box 138 may be used to analyze the frame 134. The bounding box 138 includes a two-dimensional (2-D) geometric shape configured to enclose a pixel or a plurality of pixels included in the frame 134. In some instances, image embedding, computer vision algorithms, object localization, and or/the like are used to detect a region of interest 136 in a frame 134. In some instances, facial detection, object detection, and/or emotion detection are used to analyze the frame 134. For instance, the bounding box 138 may be a rectangular area that encloses a plurality of pixels in the frame 134. In some instances, the dimensions of the bounding box may be predefined. For instance, the shape, the length, the width, and similar 2-D dimensions of geographic shapes may be predefined. In the example of a rectangular area, a length and a width of the bounding box 138 may be predefined. The bounding box 138 may be used to detect a region of interest 136 within the frame. For instance, the bounding box 138 can be moved across the frame 134. In some instances, a plurality of frames can be analyzed to determine a region of interest in each frame 134 of the plurality of frames. In some instances, one frame 134 may contain multiple regions of interest 136. In various embodiments, the bounding box 138 can be used to scan, analyze, determine, and/or detect a region of interest 136 in the entire frame 134 or a portion of the frame 134. For instance, a user 104 may indicate a user interest 122 associated with interest in the guitars (i.e., objects) in the movie "A Hard Day's Night" starring the Beatles. The movie may be broken down into a predetermined number of frames 134. Each frame 134 may then be analyzed using at least the bounding box 138. The bounding box 138, may then identify a region of interest 136 in one of the frames 134 that may contain a guitar. The region of interest 136 may then be sent to the region of interest analysis module 118 for analysis.

In various embodiments, and after analyzing the frame 134 using at least the techniques described herein, a region of interest 136 is provided to the region of interest analysis module 118. The region of interest analysis module 118 compares a region of interest 136 with identified images in a database 140. The database 140 may include a knowledge base 142. The knowledge base 142 may include an ontology representing a plurality of identified images associated with objects, faces, persons, emotions, and/activities and relationships between the identified images. That is, the database 140 may include images that depict known objects, faces, persons, activities, and so on. The ontology may include a semantic graph, and/or similar graphs, that are configured to receive an input (e.g., a region of interest 136) and output a node of the graph associated with the input. For instance, the ontology may include a hierarchy of guitar brands, designs, shapes, types, and/or colors. In various embodiments, the knowledge base may include a semantic understanding of an event. For instance, the knowledge base may include a semantic understanding of the rules of a sport (e.g., baseball). The knowledge base 142 may include machine representations of objects, faces, persons, emotions, and/or activities. The knowledge base 142 may be pre-populated. In some instances, the database 140 and/or the knowledge base 142 may automatically scrape public-websites for images and image annotations. For instance, the knowledge base 142 may scrape images and image annotations associated with guitars from a public-website to store in the database 140.

In various embodiments, a region of interest 136 is compared to an identified image in the database 140. A similarity between the region of interest 136 and images in the database 140 may be determined. For instance, a similarity value may be based on a cosine distance, a vector comparison, a Euclidean distance, or similar techniques to determine a similarity between the region of interest 136 the identified image in the database 140. In some instances, the similarity between the region of interest 136 and the identified image may include comparing a similarity value with a predetermined similarity threshold (also referred to herein as "predetermined similarity threshold value"). The region of interest 136 and the identified image may be determined to be associated with one another if a similarity value is meets or exceeds the predetermined similarity threshold. Conversely, the region of interest 136 and the identified image may be determined to not be associated with one another if a similarity value is below the predetermined similarity threshold.

In various embodiments, the region of interest analysis module 118 may receive multiple regions of interest 136 for analysis. For instance, the region of interest analysis module 118 may receive a first region of interest from a first frame of a video item 126 and a second region of interest from a second frame of the video item 126. The region of interest analysis module 118 may perform cross-frame analysis 143 to determine changes between the first frame and the second frame. For instance, the first region of interest in the first frame may enclose a 10×10 grouping of pixels in the top, right corner of the first frame. The second region of interest in the second frame may similarly enclose a 10×10 grouping of pixels in the top, right corner of the second frame. Therefore, the location first region of interest in the first frame substantially corresponds to a location of a second region of interest in the second frame. In various embodiments, the first region of interest and the second region of interest may be compared to determine a change in the 10×10 grouping of pixels. In various embodiments, cross-frame analysis 143 may be used to determine correlations between frames. For instance, cross-frame analysis 143 may be used to correlate human body positions in sequential and/or non-sequential frames or to localize an activity in multiple frames. In various embodiments, the first region of interest and the second region of interest may fully, substantially, partially, or not be located in a portion of the frame 134.

In various embodiments, the region of interest analysis module 118 may use a machine learning model and/or neural network to analyze a region of interest 136 and to identify a region of interest 136 in a frame 134. In some instances, the machine learning model may be introduced manual annotations of identified objects. For instance, the machine learning model may receive a picture of a ball that is annotated, "this is a ball." In some instances, the machine learning model may be introduced a plurality of manual annotations of identified objects. The machine learning model may then be introduced an unidentified object. The machine learning model may then produce or generate an output value representing an identification of the unidentified object. The output value may then be provided to a neural network.

In various embodiments, a neural network may be referred to as an artificial neural network or an artificial intelligence neural network. In some instances, the neural network may be a processing device, an algorithm, and/or hardware. In some instances, the neural network includes at least a processing component, a network, and a structure. The neural network identifies the object by producing a neural network output. The neural network output may include a numerical value associated with a vector output and/or a vector of features, a class value indicating a semantic answer (e.g., "this is a ball"), and/or plain-text. The output(s) of the neural network are then compared to manual annotations to determine if the output of the neural network is accurate. In some instances, the neural network output is accurate if it is within a predetermined error range when compared to the manual annotations. If an error between neural network output and the manual annotation is acceptable (e.g., within the predetermined error range) the machine learning model is determined to be trained to identify an event (e.g., an object, a face, an activity). If the error between the neural network output and the manual annotation is not considered acceptable (e.g., outside of the predetermined error range) the machine learning model is not determined to be trained. In various embodiments, a neural network is used for each type of event. For instance, a first neural network to identify objects, a second neural network to identify faces, and a third neural network to identify activities. In various embodiments, a single neural network is used to identify objects, faces, and activities.

In various embodiments, the region of interest analysis module 118 outputs a trigger event 144. The trigger event 144 is associated with the region of interest analysis module 118 identifying the region of interest 136. For instance, using the example from above, the trigger event 144 maybe be that a guitar was identified in the movie a "A Hard Day's Night" corresponding to the user interest 122. The trigger event 144 and the action selection 132 are then sent to the trigger action module 120.

In various embodiments, the trigger action module 120 receives the action selection 132 and the trigger event 144 and causes an occurrence of an action 130 to be performed. For instance, the trigger action module 120 may cause an action 130 including at least one of causing a notification to be sent to an electronic device 106, causing an SMS or an MMS to be sent to an electronic device 106, causing an electronic device 106 to be powered on and/or off, causing an electronic device 106 to increase and/or decrease in audio volume, recording a video item 126 or video item portion 128, causing the electronic device 106 to identify a second electronic device, causing the electronic device 106 to be communicatively coupled to a second electronic device, causing a summary of the event to be sent to an electronic device 106, or causing analytics associated with the trigger event 144 to be sent to the electronic device 106.

Figure 2:
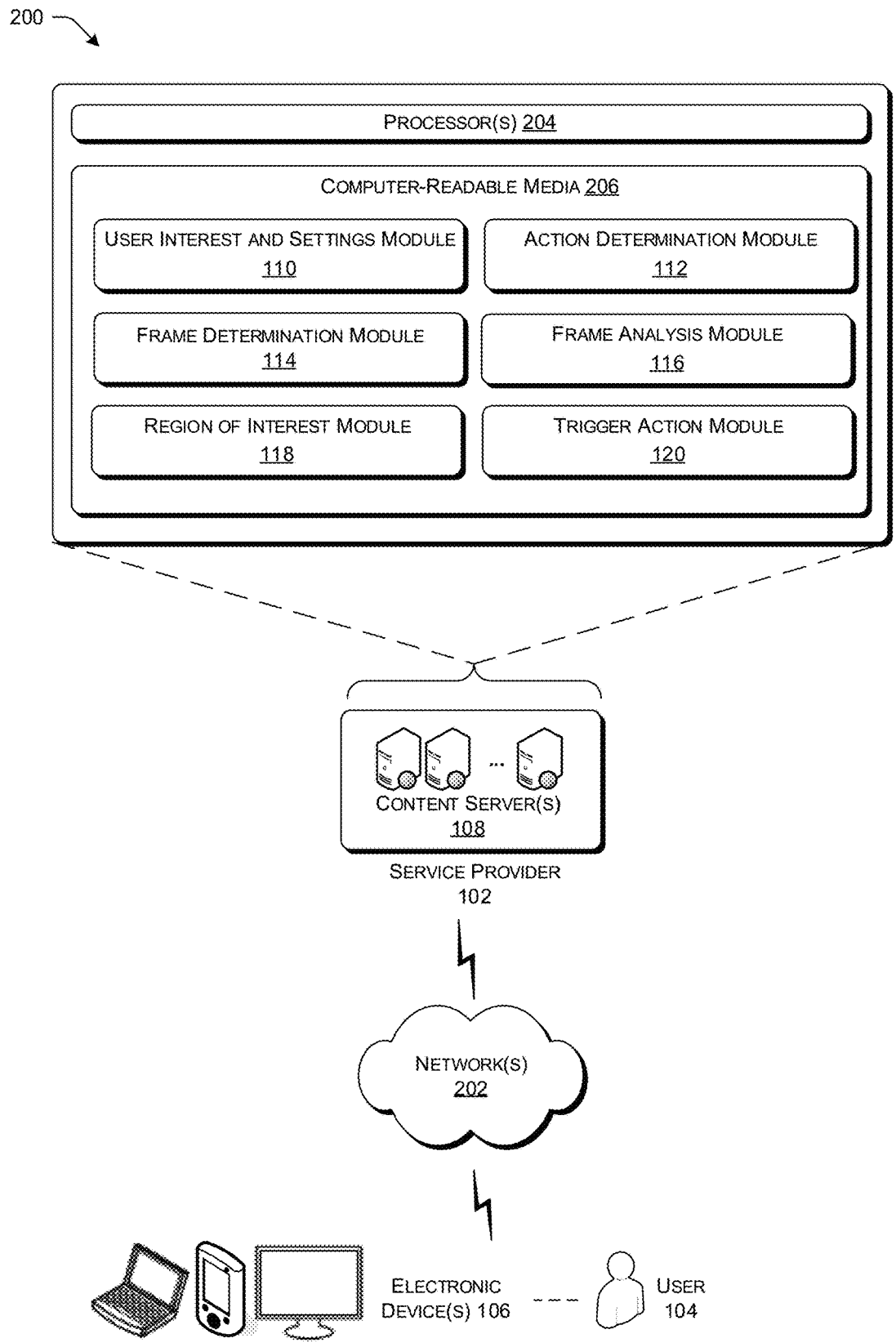
FIG. 2 illustrates an example system that includes multiple devices that facilitate the triggering of an action based on identifying an event in a video item.

FIG. 2 illustrates an example system that includes multiple devices that facilitate the triggering of an action based on identifying an event in a video item. More particularly, the system 200 may include the service provider 102, a user 104, an electronic device 106 associated with the user 104, and one or more network(s) 202. As shown, the service provider 102 may include, or be associated with, the one or more content server(s) 108, which may include one or more processor(s) 204 and computer-readable media 206. The computer-readable media 206 may maintain or store the user interest and settings module 110, the action determination module 112, the frame determination module 114, the frame analysis module 116, the region of interest analysis module 118, the trigger action module 120, and possibly other modules that perform the operations described herein.

For the purposes of this discussion, the service provider 102 may be any entity, server(s), platform, service, etc. that facilitates operations to be performed by the user interest and settings module 110, the action determination module 112, the frame determination module 114, the frame analysis module 116, the region of interest analysis module 118, and/or the trigger action module 120. In particular, the service provider 102 may maintain a platform or site in which a user 104 may access via an electronic device 106 in order to indicate a user interest 122, indicate a user action selection 124, and/or to manage user settings and/or user preferences. The video item 126 may be provided to the service provider 102 by one or more entities that author, create, produce, broadcast, or facilitate presentation of the video item 126. The service provider 102 may also be associated with a retail marketplace (e.g., a website) that allows a user 104 to search for, browse, view, borrow, return, acquire, etc. items (e.g., products, services, digital items, etc.) that are maintained by the service provider 102, and that are possibly maintained on behalf of other entities (e.g., artists, authors, publishers, vendors, other service providers, merchants, etc.). In certain embodiments, the service provider 102 may offer a video service in which video items (e.g., stored video items, live video items, etc.) may be consumed by users 104.

Figure 3:
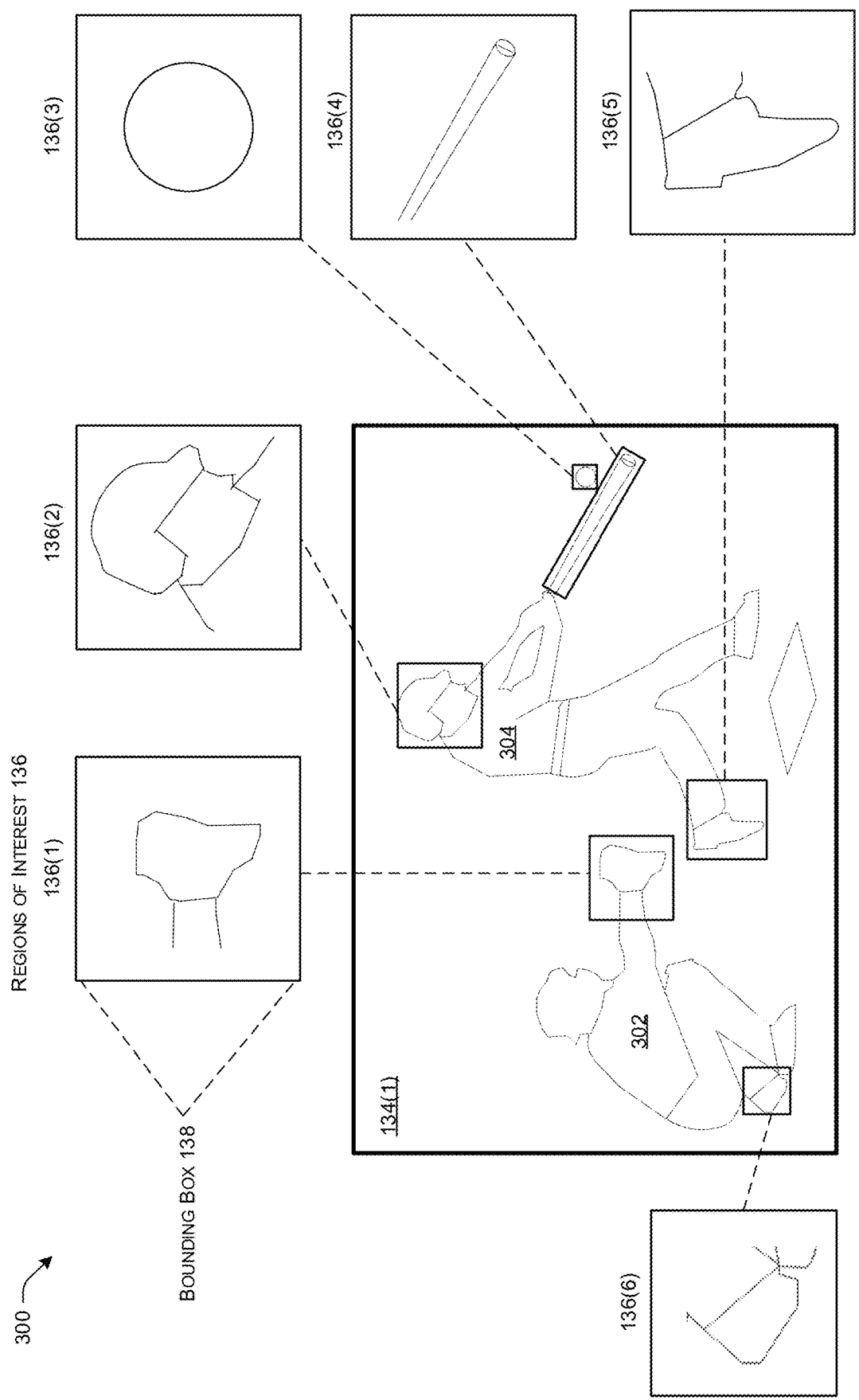
FIG. 3 is a diagram of an illustrative process to determine region(s) of interest with respect to a frame of a video item.

FIG. 3 is a pictorial diagram 300 of an illustrative process to determine region(s) of interest with respect to a frame of a video item. The pictorial diagram 300 includes an example of identifying regions of interest 136(1)-136(6) within a frame 134(1). Depicted within frame 134(1) are two persons participating in a game of a baseball. Frame 134(1) may be a snapshot and/or screenshot representing a time period of a live-stream or a pre-recorded baseball game. A first player 302 is crouched preparing to receive a pitch (e.g., a baseball being thrown). A second player 304 is "at-bat" and preparing to attempt to hit the baseball being thrown to the first player 302. A bounding box 138 is used to analyze the frame 134(1).

The bounding box 138 may be moved across the pixels contained within frame 134(1) to scan, analyze, determine, and or detect regions of interest 136(1)-136(6). The bounding box 138 may include a rectangular area to enclose and analyze a set of pixels contained within the frame 134(1). In various embodiments, the bounding box 138 may be another geometric shape. The bounding box 138 within frame 134(1) maybe be based on predetermined dimensions. The bounding box 138 may be used to detect objects, persons, and/or faces as shown in pictorial diagram 300. In various embodiments, the bounding box 138 may be used to detect activities. The bounding box 138 may be used to analyze frame 134(1) to identify a region of interest 136 that is related to a user interest 122. The bounding box 138 is showing two regions of interest 136(1) and 136(6) associated with the first player 302 and four regions of interest 136(2)-136(5) associated with the second player. As shown, the first region of interest 136(1) appears to depict a glove being worn by the first player 302, the second region of interest 136(2) appears to depict a head of the second player 304, the third region of interest 136(3) appears to depict a baseball that the second player 304 is attempting to hit, the fourth region of interest 136(4) appears to depict a bat being held and swung by the second player 304, the fifth region of interest 136(5) appears to depict a right foot of the second player 304, and the sixth region of interest 136(6) appears to depict a left foot of the first player 302.

Figure 4:
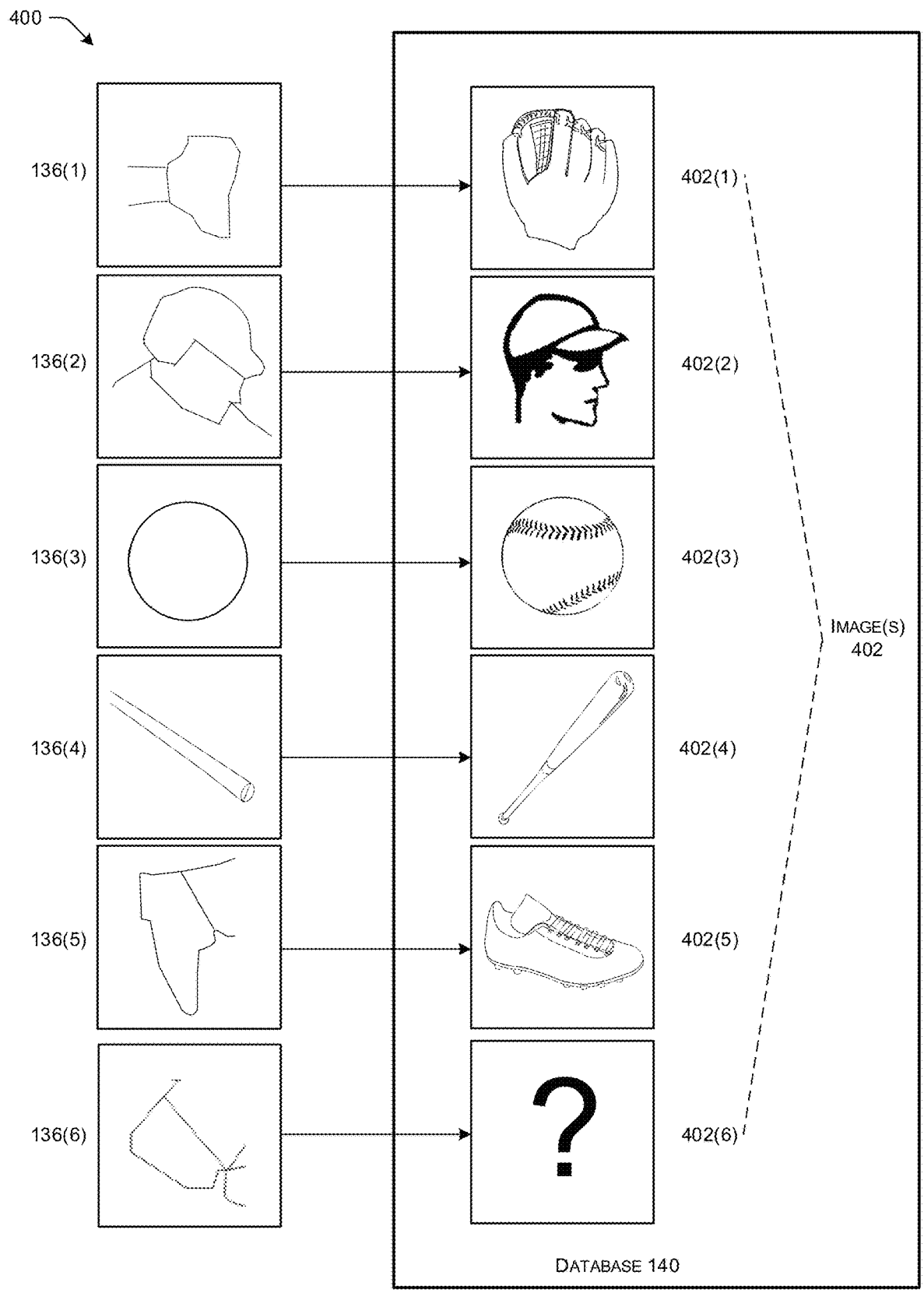
FIG. 4 is a diagram of an illustrative process to analyze region(s) of interest with respect to a database.

FIG. 4 is a diagram 400 of an illustrative process to analyze regions of interest 136(1)-136(6). Regions of interest 136(1)-136(5) are compared to identified images 402 in a database. Region of interest 136(6) is not associated with an identified image 402(6) in the database 140. In various embodiments, the region of interest analysis module 118 may compare regions of interest 136(1)-136(6) with images 402 that stored in a knowledge base of the database 140. The knowledge base may include an ontology representing a plurality of identified images associated with objects, faces, persons, emotions, and/or activities and their relationships in the database 140.

Regions of interest 136(1)-136(5) may be identified as depicting various objects and a human face based on a comparison with images 402 in the database. Region of interest 136(6) may have insufficient graphical information to be identified by the database 140. In some instances, the database 140 may not contain an image 402(6) that corresponds to the region of interest 136(6). In various embodiments, the database 140 and/or a knowledge base may be pre-populated with images. In some instances, the database 140 and/or the knowledge base may scrape public-websites from images 402 and image annotations and store the images 402 in the database 140. Regions of interest 136(1)-136(5) may be associated with images 402(1)-402(5) based on a similarity value. For instance, region of interest 136(1) may be determined to be associated with image 402(1) based on a similarity value. The similarity value may be based on a cosine distance, a vector comparison, a Euclidean distance, and/or similar metrics quantifying the similarity between the region of interest 136(1) and image 402(1). The region of interest 136(1) and image 402(1) may have a similarity value that is equal to or exceeds a predetermined similarity threshold. In various embodiments, the region of interest 136(1) and image 402(1) may be compared based on a pixel-by-pixel comparison. In various embodiments, an object, face, etc., depicted in a region of interest 136 may be determined to be similar to a known object, face, etc., depicted in stored image 402 based on a meeting a condition (e.g., determined similarity value meeting or exceeding a similarity threshold amount and/or being within a similarity threshold range). If the condition is met, it may be determined that the region of interest 136 matches an image 402 stored in the database. Conversely, region of interest 136(6) and image 402(6) may have a similarity value that is less than a predetermined similarity threshold. Therefore, region of interest 136(6) may not be identified.

As shown, the first region of interest 136(1) appears to be identified as a glove 402(1), the second region of interest 136(2) appears to be identified as a head 402(2), the third region of interest 136(3) appears to be identified as a baseball 402(3), the fourth region of interest 136(4) appears to be identified as a bat 402(4), and the fifth region of interest 136(5) appears to be identified as a right foot 402(5). The objects and head depicted in regions of interest 136(1)-136(5) may be compared respectively to images 402(1)-402(5). Based on the comparison, a similarity value may have been determined representing an amount of similarity between two images. In some instances, the similarity value may have been equal to or exceeded or a predetermined similarity threshold. In some instances, the similarity value may have been within a predetermined similarity range. Therefore, the similarity values between regions of interest 136(1)-136(5) and images 402(1)-402(5) may be a threshold amount of similarity. As shown, the sixth region of interest 136(6) appears to be unidentified as shown by the question mark 402(6). The object in region of interest 136(6) remains unidentified with a previously stored image 402 in database 402. In some instances, the objection in region of interest 136(6) was compared to a plurality of images 402 stored in the database 140. Based on the comparison(s), a similarity value may have been determined representing an amount of similarity between region of interest 136(6) and an image 402 stored in the database. In some instances, the similarity value may have been lower than predetermined similarity threshold. In some instances, the similarity value may have been outside of a predetermined similarity range. Therefore, the similarity value did not satisfy a threshold amount of similarity.

Figure 5:
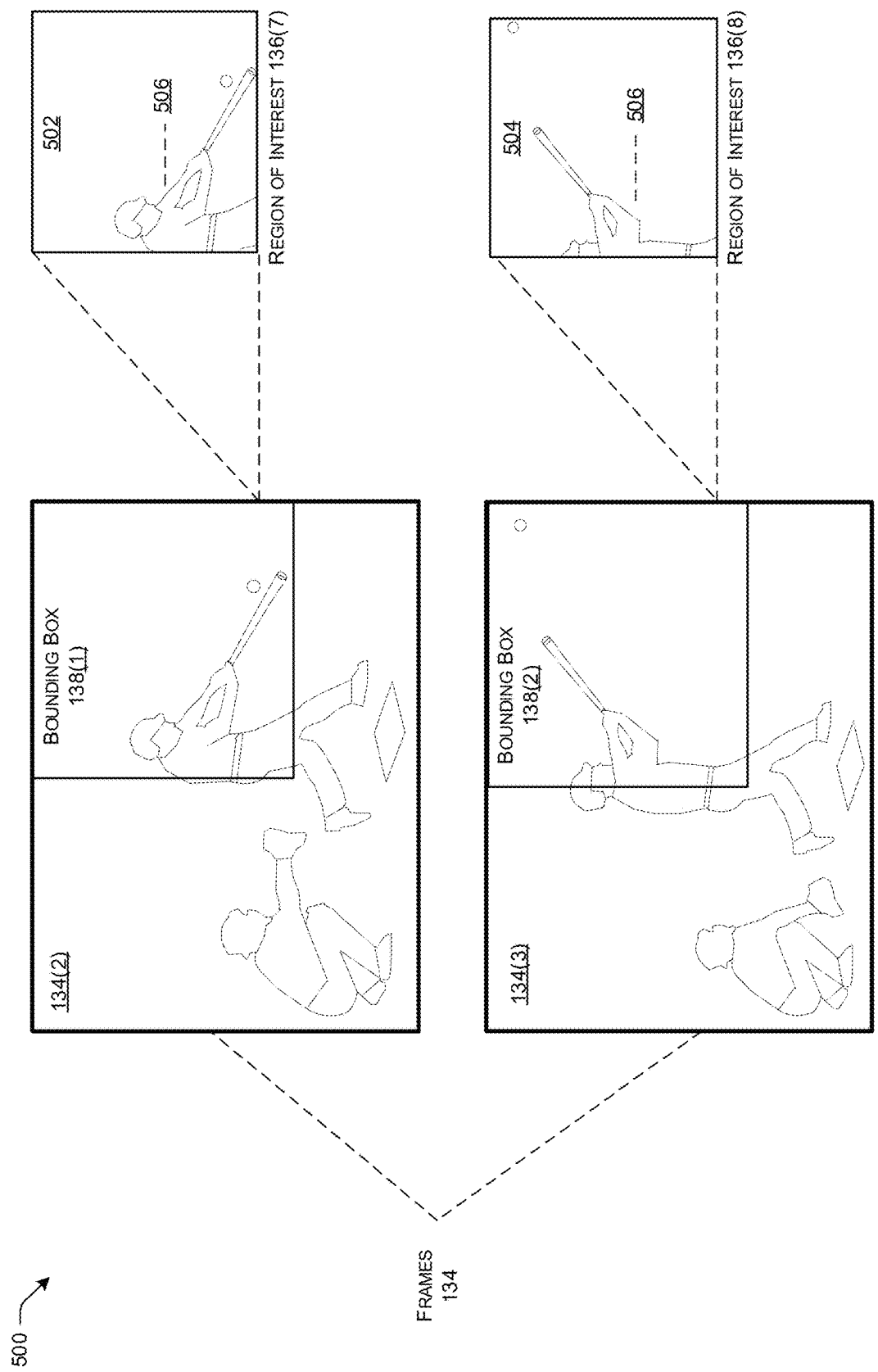
FIG. 5 is a diagram an illustrative process to analyze region(s) of interest with respect to a video item.

FIG. 5 is a pictorial diagram 500 an illustrative process to analyze regions of interest 136(7) and 136(8) included in frames 134. The region of interest analysis module 118 may perform cross-frame analysis 143 to determine a change between frame 134(2) and 134(3). For instance, frame 134(2) may be a snapshot and/or screenshot representing a first time period of a live-stream or a pre-recorded baseball game. Frame 134(3) may be a snapshot and/or screenshot representing a second time period of the live-stream or a pre-recorded baseball game. Frame 134(3) may be temporally after frame 134(2). In various embodiments, more than two frames 134 may be used to perform cross-frame analysis 143. In various embodiments, at least two frames 134 may be arranged chronologically and/or sequentially and analyzed.

Frame 134(2) includes bounding box 138(1) enclosing a first portion of pixels. Frame 134(3) includes bounding box 138(2) enclosing a second portion of pixels. Bounding box 138(1) and bounding box 138(2) may be substantially the same shape and/or dimensions. In various embodiments, they may be different shapes, sizes, and/or dimensions. In various embodiments, bounding box 138(1) may be located in a portion of frame 134(2) that substantially corresponds or partially corresponds to a location of bounding box 138(2) in frame 134(3). In various embodiments bounding box 138(1) may be configured to enclose an entirety of frame 134(2) and bounding box 138(2) may be configured to enclose an entirety of frame 134(3).

Region of interest 136(7) includes a first snap shot 502 representing objects, a player, and activities in a baseball game during a first time period. Region of interest 136(8) includes a second snap shot 504 representing the objects, the player 506, and activities in the baseball game during a second time period. Regions of interest 136(7) and 136(8) may be compared with respect to the body position of the player 506, the face of the player 506, and/or the location of the objects including within the respective regions of interest. In various embodiments, the objects and/or faces including in regions of interest 136(7) and 136(8) can be identified using the region of interest analysis module 118. In various embodiments, markers (e.g., points) may be placed on a human body (e.g., on player 506) included in frame 134(2). For instance, points may be placed on the joints of a human body. In some instances, lines connecting the markers may be used to generate a skeletal representation the player 506. For instance, a marker on a wrist joint, elbow joint, and/or a shoulder joint may be connected by lines to generate a representation of an arm of the player 506. The representation of the arm of player 506 may be analyzed in frames 134(2) and 134(3) to determine changes in arm position over time. In various embodiments, human activity detection in multiple frames may be compared to identified human activities stored in a database. For instance, region of interest 136(7) includes the player 506 swinging at a ball during a first time period. Region of interest 136(8) includes the player 506 completing a swing during a second time period and depicts a baseball being hit. The human activity of "hitting a ball" may be identified.

Figure 6:
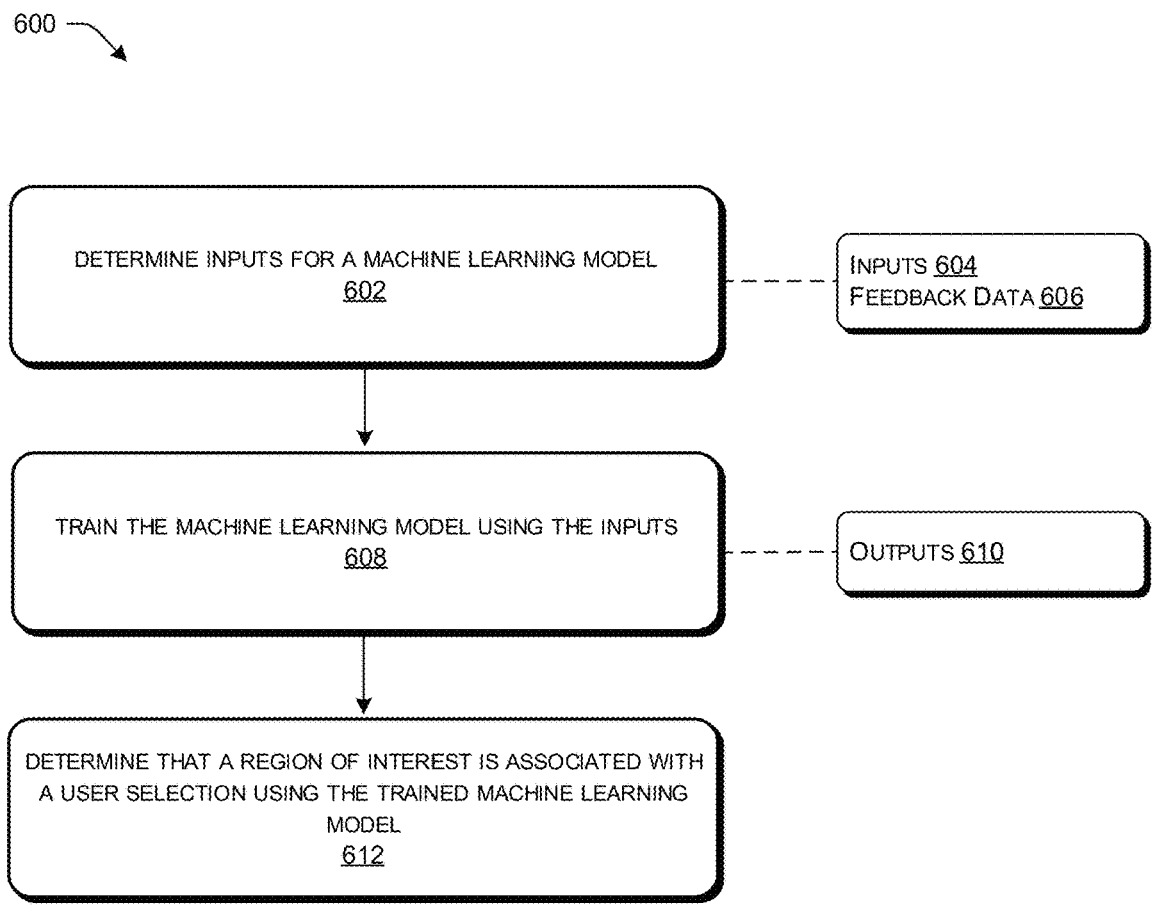
FIG. 6 is a flow diagram illustrating an example process of determining inputs and outputs of a machine learning model.

FIG. 6 is a flow diagram illustrating an example process 600 of determining inputs and outputs of a machine learning model. Moreover, the following actions described with respect to FIG. 6 may be performed by the service provider 102 and/or the content server(s) 108, as illustrated in, and described with respect to FIGS. 1 and 2.

Block 602 illustrates determining inputs 604 for a machine learning model. The inputs 602 may be manual annotations of identified objects. For instance, the machine learning model may receive a picture of a hat that is annotated "hat." In various embodiments, the inputs 602 may include a frame 134 of a video item 126. In various embodiments feedback data 606 may be used as an input 602. In some instances, a previous occurrence of an action was triggered. In response, a user 104 may provide feedback data 606 in the form of comments, corrections, and/or feedback indicating an accuracy and/or helpfulness of the identified region and/or the triggered action. For instance, a user 104 may provide feedback data 606 based on selections in predefined fields (e.g., thumbs up/down, a scale from 1-10, a rating of 1-5 stars, or the like). In various embodiments, a user 104 may provide feedback data 606 in the form of comments in a provided field.

Block 608 illustrates training the model using the inputs 604. The machine learning model may be introduced an unidentified object and generate an output 610 in response. In some instances, the output 610, is a quantitative value. The output 610 may be provided to a neural network as a neural network input. In various embodiments, the neural network can be used to determine if the machine model is trained. The neural network uses the output 610 to identify the unidentified object by producing a neural network output. The neural network output may include a numeric value associated with a vector output and/or a vector of features, a class value indicating a semantic answer (e.g., "this is a ball"), and/or plain-text. The output(s) of the neural network are then compared to manual annotations to determine if the output of the neural network is accurate. In some instances, the neural network output is accurate if it is within a predetermined error range when compared to the manual annotations. If an error between neural network output and the manual annotation is acceptable (e.g., within the predetermined error range), the machine learning model is determined to be trained to identify an event (e.g., an object, a face, an activity).

Block 612 illustrates determining that a region of interest is associated with a user selection using the trained machine learning model. In various embodiments, the trained machine learning model may be used to identify an object included with a region of interest. In some instances, the object is identified by the trained machine learning model. In various embodiments, the identified object may be compared to a user interest 122 to produce a similarity value. In some instances, the similarity value may be compared with a predetermined similarity threshold. If the similarity value equals to or exceeds the predetermined similarity threshold, the region of interest is associated with the user interest 122.

Figure 7:
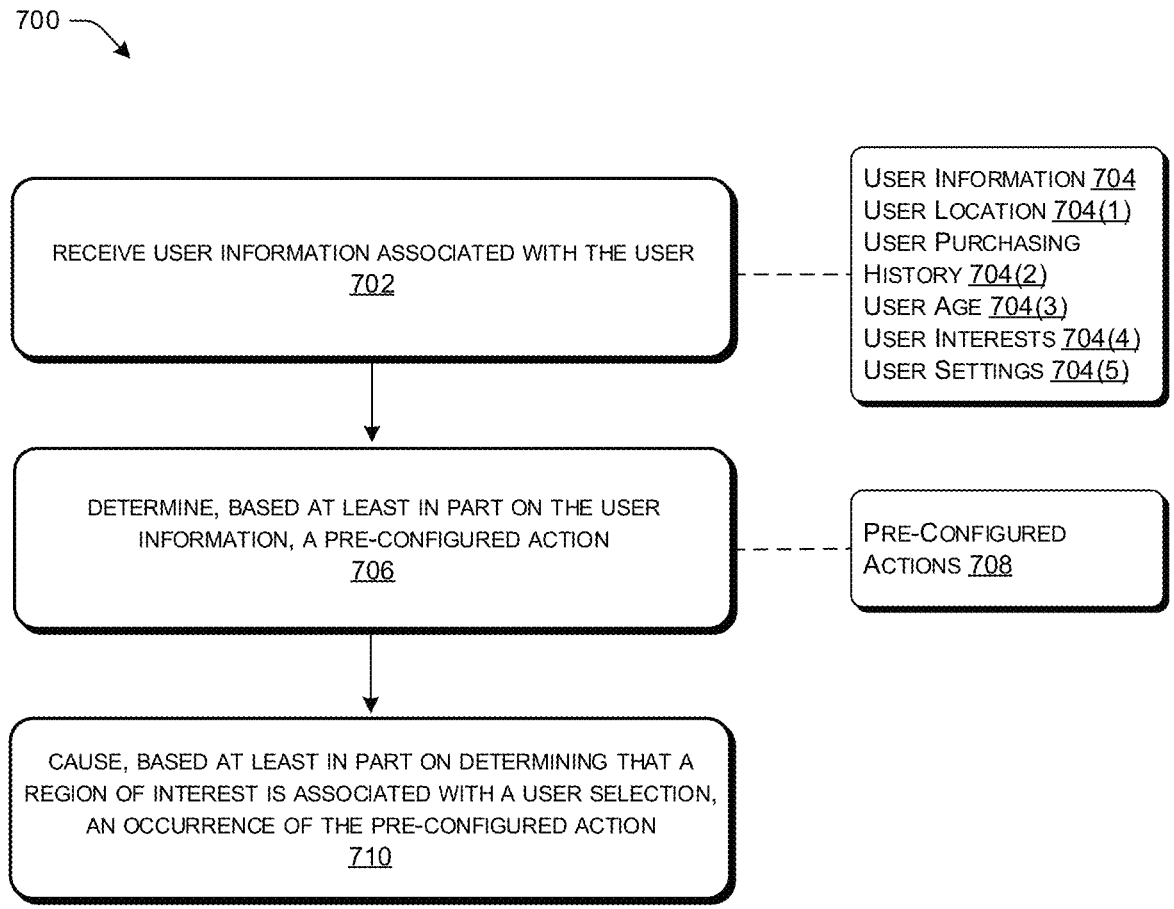
FIG. 7 is a flow diagram illustrating an example process of determining an additional action based on identifying an event in a video item.

FIG. 7 is a flow diagram illustrating an example process 700 of determining an action based on identifying an event in a video item. Moreover, the following actions described with respect to FIG. 7 may be performed by the service provider 102 and/or the content server(s) 108, as illustrated in, and described with respect to FIGS. 1 and 2.

Block 702 illustrates receiving user information 704 associated with a user 104. User information 704 may include a user location 704(1), a user purchasing history 704(2), a user age 704(3), user interests 704(4), and/or user settings 704(5). For instance, user settings 704(5) may indicate that a user 104 has opted-in to receiving notifications with respect to user interests 122.

Block 706 illustrates determining, based at least in part on the user information 704, a pre-configured action 708. In various embodiments, the user information 704 may be used to recommend a pre-configured action 708 that a user 104 may select. For instance, a user purchasing history 704(2) may indicate a user 104 has recently purchased an intelligent personal assistant and/or smart speakers. Therefore, a user 104 may be recommended a pre-configured action 708 such as audio notifications via the intelligent personal assistant and/or smart speakers. In various embodiments, a user 104 may opt-in to the recommended, pre-configured action 708.

Block 710 illustrates causing, based at least in part on determining that a region of interest is associated with a user selection, an occurrence of the pre-configured action 708. In various embodiments, the pre-configured action 708 is triggered. For instance, a user 104 may have been recommended, and subsequently opted into by user 104, audio notifications via an intelligent personal assistant and/or smart speakers. In various embodiments one or more pre-configured actions 708 may be triggered in response to determining that a region of interest is associated with a user selection. Pre-configured actions 708 may include receiving a notification, receiving an short message service (SMS) message, receiving a multimedia messaging service (MMS) message, receiving an e-mail message, causing the video item to be presented via an electronic device, causing an electronic device to be powered on and/or off, causing an electronic device to increase and/or decrease in audio volume, recording a video item and/or video item portion, causing an electronic device to identify a second electronic device, causing an electronic device to be communicatively coupled to a second electronic device, causing a summary of the event to be sent to the user 104, and/or causing analytics associated with the event to be sent to an electronic device associated with the user 104.

Figure 8:
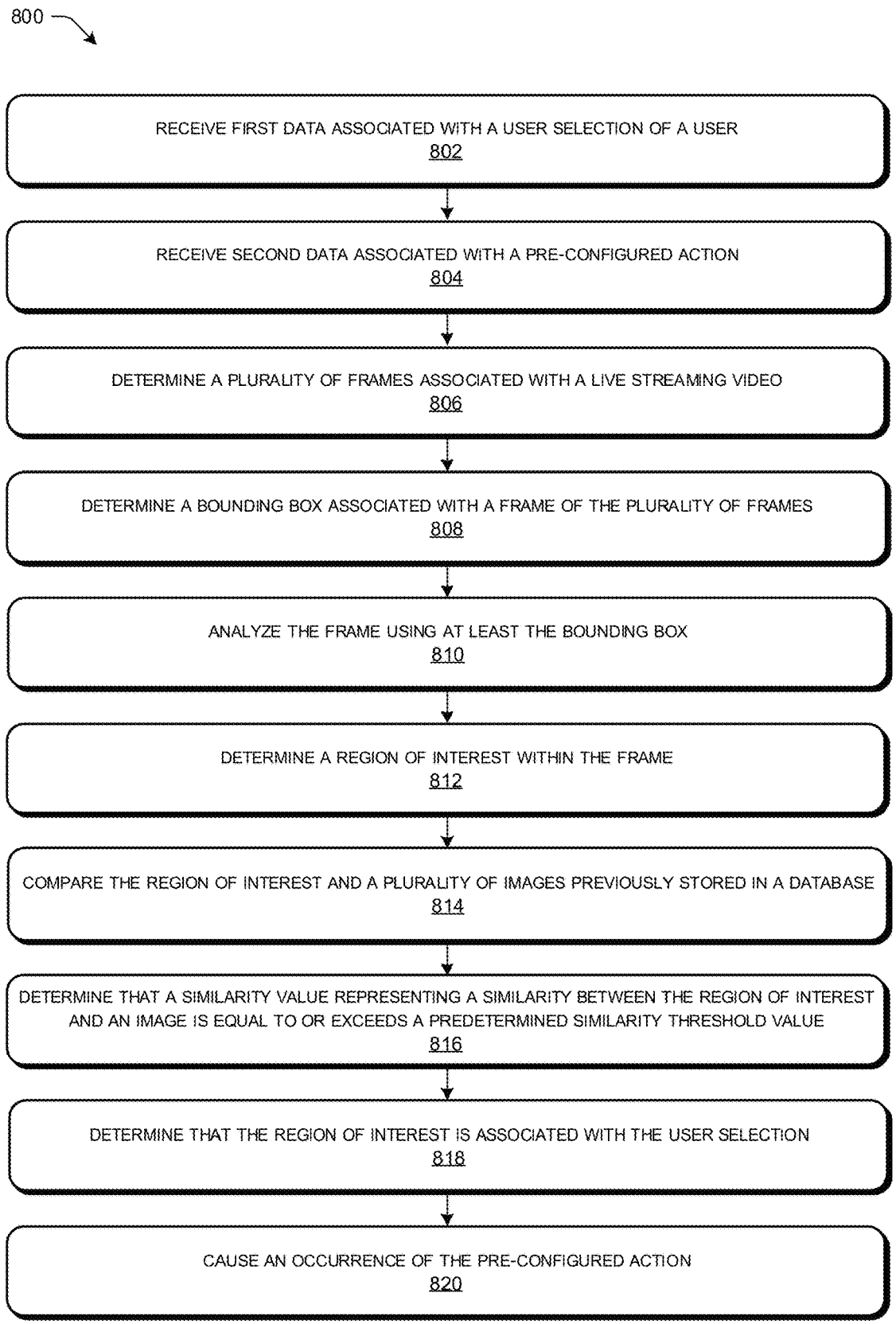
FIG. 8 is a flow diagram illustrating an example process of triggering an action based on identifying an event in a video item.

FIG. 8 is a flow diagram illustrating an example process 800 of triggering an action based on identifying an event in a video item. Moreover, the following actions described with respect to FIG. 8 may be performed by the service provider 102 and/or the content server(s) 108, as illustrated in, and described with respect to FIGS. 1 and 2.

Block 802 illustrates receiving first data associated with a user selection of a user. In various embodiments, a user 104 provides a user selection indicating an event (e.g., an object, a person, a face, and/or an activity) associated with the event. For instance, a user 104 may indicate that they are interested in a particular character in a television show. In various embodiments, the user selection may be associated with user settings and/or user preferences. In some instances, the user selection may be associated with interests of the user. In various embodiments, the user selection may be in response to a system generated recommendation.

Block 804 illustrates receiving second data associated with a pre-configured action. In various embodiments, a user 104 may indicate an action to associated with the events. In some instances, the pre-configured action may include receiving a notification, receiving an SMS, receiving an MMS, receiving an e-mail message, causing the video item to be presented via an electronic device, causing an electronic device to be powered on and/or off, causing an electronic device to increase and/or decrease in audio volume, recording a video item or video item portion, causing a summary of the event to be sent to the user, and/or causing analytics associated with the event to be sent to the user. In various embodiments, multiple pre-configured actions may be indicated by the user 104.

Block 806 illustrates determining a plurality of frames associated with a live streaming video. In various embodiments, a frame may include an image representing a time period, interval, and/or instance of the live streaming video. The live streaming video can be broken into a predetermined number of frames. In some instances, the live streaming video may be previously broken into frames and received by the content servers.

Block 808 illustrates determining a bounding box associated with a frame of the plurality of frames. In various embodiments, the bounding box is associated with analyzing a particular frame. In various embodiments, a bounding box includes a rectangular area and is configured to enclose a set of pixels included in the frame. In some instances, the bounding box may be a predefined size, shape, and/or dimensions. In some instances, the bounding box may be configured to enclose an entirety of a frame.

Block 810 illustrates analyzing a frame using at least the bounding box. In various embodiments, the bounding box may be used to detect regions of interest in the frame. For instance, a bounding box may be moved across the pixels included in the frame to determine regions of interest. In various embodiments, the bounding box may use object detection, facial detection, activity detection, emotion detection, computer vision learning algorithms, object locations, and/or the like to detect regions of interest in the frame.

Block 812 illustrates determining a region of interest within a frame. In various embodiments, a bounding box may be used to determine the region of interest within the frame. In various embodiments, the bounding box may identify an object, a face, and/or an activity included in the frame.

Block 814 illustrates comparing a region of interest and a plurality of images previously stored in a database. In various embodiments, the region of interest and images previously stored in a database and/or knowledge base may be compared to determine a similarity value. For instance, a similarity value may be based on a cosine distance, a vector comparison, or a Euclidean distance between the region of interest and an image stored in the database. In various embodiments, the database and/or knowledge base may store images and associated image annotations.

Block 816 illustrates determining that a similarity value representing a similarity between a region of interest an image is equal to or exceeds a predetermined similarity threshold.

Block 818 illustrates determining that the region of interest is associated with the user selection. In various embodiments, a machine learning model and/or neural networks may be used to determine that the region of interest is associated with the user selection. For instance, a user selection may indicate a user 104 is interested in a particular actor wearing a particular brand of running shoes (e.g., a user selection). In addition, the region of interest may include the particular actor is wearing running shoes. The machine learning model may identify the particular is wearing a brand of running shows that corresponds to the user selection. Therefore, the region of interest may be associated with the user selection.

Block 820 illustrates causing an occurrence of a pre-configured action. In various embodiments, the pre-configured action may be selected by a user 104. In various embodiments, multiple pre-configured actions may be triggered based on a region of interest being associated with a user selection and/or user interests.

Note that the various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving a first indication associated with an event;
receiving a second indication associated with a pre-configured action associated with the event;
determining a frame of a video, wherein the frame represents an image during a time period of the video and the video being a live video;
determining a region of interest that includes a set of pixels included in the frame;
comparing the region of interest and a plurality of events that include the event;
determining, based at least in part on comparing the region of interest and the plurality of events, that the region of interest indicates that the event has yet to occur in the video but is likely to occur in the video within a predetermined period of time; and
causing, based at least in part on determining the region of interest indicates that the event has yet to occur in the video but is likely to occur in the video within the predetermined period of time, and prior to a first occurrence of the event in the video, a second occurrence of the pre-configured action.

2. The method as recited in claim 1, further comprising:
determining inputs for a machine learning model, the inputs including the frame; and
training the machine learning model using the inputs to determine at least one of an object, a human face, or an activity, and wherein determining that the region of interest is associated with the event further comprises determining that the region of interest is associated with the event using the machine learning model.

3. The method as recited in claim 1, further comprising:
determining a second frame of the video, wherein the second frame represents a second image during a second time period of the video;
determining a second region of interest that includes a second set of pixels included in the second frame; and
determining, based at least in part on comparing the region of interest and the second region of interest, a frame change between the frame and the second frame, the frame change representing a difference between the set of pixels in the frame and the second set of pixels in the second frame, and wherein determining the region of interest is associated with the event is further based at least in part on the frame change.

4. The method as recited in claim 1, further comprising:
receiving user information, the user information including at least one of a user interest, a user age, a user location, or a user purchase;
determining, based at least in part on the user information, an additional pre-configured action; and
causing, based at least in part on determining the region of interest is associated with the event, a third occurrence of the additional pre-configured action.

5. The method as recited in claim 1, wherein the event includes at least one of an object, a face, or an activity, and further comprising:
determining, based at least in part on comparing the region of interest and the plurality of events, that a similarity value representing a similarity between the region of interest and the event equals to or exceeds a predetermined similarity threshold, and wherein determining the region of interest is associated with the event is further based at least in part on the similarity.

6. The method as recited in claim 1, wherein the first indication includes at least one of a user input, a user selection, or a user setting, and wherein the pre-configured action includes at least one of:
causing a notification to be sent;
causing a short message service (SMS) message to be sent;
causing a multimedia messaging service (MMS) message to be sent;
causing an email message to be sent;
causing at least a portion of the video to be stored;
causing an electronic device to be powered on;
causing the electronic device to be powered off;
causing an increase in audio volume associated with the electronic device;
causing a decrease in the audio volume associated with the electronic device;
causing the electronic device to present the video;
causing the electronic device to identify a second electronic device;
causing the electronic device to be communicatively coupled to the second electronic device;
causing a summary of at least a portion of the video to be sent; or
causing analytics associated with at least a portion of the video to be sent.

7. The method as recited in claim 1, wherein analyzing the frame further comprises:
determining a bounding box, the bounding box including an area and configured to enclose a plurality of pixels included in the frame; and
analyzing at least a first portion of the frame using the bounding box.

8. The method as recited in claim 1, further comprising:
determining an additional region of interest, the additional region of interest including an additional set of pixels included in the frame;
comparing the additional region of interest and the plurality of events; and
determining, based at least in part on the comparing the region of interest and the plurality of events, that the additional region of interest is not associated with the event.

9. A system comprising:
one or more processors; and
memory storing computer-executable instructions that, when executed, cause the one or more processors to perform acts comprising:
receiving a first indication associated with an event;
receiving a second indication associated with a pre-configured action associated with the event;
determining a frame of a video, wherein the frame represents an image during a time period of the video and the video being a live video occurring in real-time;
determining a region of interest that includes a set of pixels included in the frame;
comparing the region of interest and a plurality of events that include the event;
determining, based at least in part on comparing the region of interest and the plurality of events, that the region of interest indicates that the event has yet to occur in the video but is likely to occur in the video within a predetermined period of time; and
causing, based at least in part on determining the region of interest indicates that the event has yet to occur in the video but is likely to occur in the video within the predetermined period of time, and prior to a first occurrence of the event in the video, a second occurrence of the pre-configured action.

10. The system as recited in claim 9, wherein the acts further comprise:
determining inputs for a machine learning model, the inputs including the frame; and
training the machine learning model using the inputs to determine at least one of an object, a human face, or an activity, and wherein determining that the region of interest is associated with the event further comprises determining that the region of interest is associated with the event using the machine learning model.

11. The system as recited in claim 10, wherein the acts further comprise:
receiving, based at least in part on causing the second occurrence of the pre-configured action, feedback data from a user, the feedback data including at least one of user comments or an accuracy value associated with determining the region of interest is associated with the event;
and wherein the inputs further include the feedback data.

12. The system as recited in claim 9, wherein the acts further comprise:
determining a second frame of the video, wherein the second frame represents a second image during a second time period of the video;
determining, a second region of interest that includes a second set of pixels included in the second frame; and
determining, based at least in part on comparing the region of interest and the second region of interest, a frame change between the frame and the second frame, the frame change representing a difference between the set of pixels in the frame and the second set of pixels in the second frame, and wherein determining the region of interest is associated with the event is further based at least in part on the frame change.

13. The system as recited in claim 9, wherein the acts further comprise:
receiving user information, the user information including at least one of a user interest, a user age, a user location, or a user purchase;
determining, based at least in part on the user information, an additional pre-configured action; and
causing, based at least in part on determining the region of interest is associated with the event, a third occurrence of the additional pre-configured action.

14. The system as recited in claim 9, wherein the event includes at least one of an object, a human face, or an activity, and the acts further comprise:
determining, based at least in part on comparing the region of interest and the plurality of events, that a similarity value representing a similarity between the region of interest and the event equals to or exceeds a predetermined similarity threshold, and wherein determining the region of interest is associated with the event is further based at least in part on the similarity value.

15. The system as recited in claim 9, wherein the first indication includes at least one of a user input, a user selection, or a user setting, and wherein the pre-configured action includes at least one of:
causing a notification to be sent;
causing a short message service (SMS) message to be sent;
causing a multimedia messaging service (MMS) message to be sent;
causing an email message to be sent;
causing at least a portion of the video to be stored;
causing an electronic device to be powered on;
causing the electronic device to be powered off;
causing an increase in audio volume associated with the electronic device;
causing a decrease in the audio volume associated with the electronic device;
causing the electronic device to present the video;
causing the electronic device to identify a second electronic device;
causing the electronic device to be communicatively coupled to the second electronic device;
causing a summary of at least a portion of the video to be sent; or
causing analytics associated with at least a portion of the video to be sent.

16. The system as recited in claim 9, wherein analyzing the frame further comprises:
determining a bounding box associated with the frame, the bounding box including an area and configured to enclose a plurality of pixels included in the frame; and
analyzing at least a first portion of the frame using the bounding box.

17. One or more non-transitory computer-readable storage media comprising one or more computer-executable instructions executable by one or more processors to cause a computing device to perform operations comprising:
receiving a first indication associated with an event;
receiving a second indication associated with a pre-configured action associated with the event;
determining a frame of a video, wherein the frame represents an image during a time period of the video;
determining a region of interest that includes a set of pixels included in the frame;
comparing the region of interest and a plurality of events that include the event;
determining, based at least in part on comparing the region of interest and the plurality of events, that the region of interest is associated with the event; and
causing, based at least in part on determining the region of interest is associated with the event and prior to a first occurrence of the event in the video, a second occurrence of the pre-configured action, the pre-configured action including at least one of sending a notification to an electronic device associated with the first indication or causing an adjustment in audio volume associated with the electronic device, the notification indicating that the event is likely to occur in the video.

18. The one or more computer-readable storage media as recited in claim 17, the operations further comprising:
determining inputs for a machine learning model, the inputs including the frame; and
training the machine learning model using the inputs to determine at least one of an object, a human face, or an activity, and wherein determining that the region of interest is associated with the event further comprises determining that the region of interest is associated with the event using the machine learning model.

19. The one or more computer-readable storage media as recited in claim 17, the operations further comprising:
determining a second frame of the video, wherein the second frame represents a second image during a second time period of the video;
determining a second region of interest that includes a second set of pixels included in the second frame; and determining, based at least in part on comparing the region of interest and the second region of interest, a frame change between the frame and the second frame, the frame change representing a difference between the set of pixels in the frame and the second set of pixels in the second frame, and wherein determining the region of interest is associated with the event is further based at least in part on the frame change.

20. The one or more computer-readable storage media as recited in claim 17, the operations further comprising:
receiving user information, the user information including at least one of a user interest, a user age, a user location, or a user purchase;
determining, based at least in part on the user information, an additional pre-configured action; and
causing, based at least in part on determining the region of interest is associated with the event, a third occurrence of the additional pre-configured action.

* * * * *